US011861836B2

(12) United States Patent
Nakane et al.

(10) Patent No.: US 11,861,836 B2
(45) Date of Patent: Jan. 2, 2024

(54) IMAGE ANALYSIS METHOD, ESTIMATING DEVICE, ESTIMATING SYSTEM, AND STORAGE MEDIUM

(71) Applicant: APSAM Imaging Corp., Osaka (JP)

(72) Inventors: Kazuaki Nakane, Osaka (JP); Chaoyang Yan, Nanjing (CN); Xiangxue Wang, Cleveland, OH (US); Yao Fu, Nanjing (CN); Haoda Lu, Nanjing (CN); Xiangshan Fan, Nanjing (CN); Michael D. Feldman, Philadelphia, PA (US); Anant Madabhushi, Cleveland, OH (US); Jun Xu, Nanjing (CN)

(73) Assignee: APSAM Imaging Corp., Osaka (JP)

( * ) Notice: Subject to any disclaimer, the term of this patent is extended or adjusted under 35 U.S.C. 154(b) by 408 days.

(21) Appl. No.: 17/327,993

(22) Filed: May 24, 2021

(65) Prior Publication Data

US 2022/0207738 A1 Jun. 30, 2022

(30) Foreign Application Priority Data

Dec. 28, 2020 (JP) ................................ 2020-219604

(51) Int. Cl.
*G06T 7/00* (2017.01)
*G06N 20/00* (2019.01)
*G06F 18/23213* (2023.01)

(52) U.S. Cl.
CPC ...... *G06T 7/0014* (2013.01); *G06F 18/23213* (2023.01); *G06N 20/00* (2019.01);
(Continued)

(58) Field of Classification Search
CPC ......... G06T 7/0014; G06T 2207/20081; G06T 2207/30024; G06T 2207/30096;
(Continued)

(56) References Cited

U.S. PATENT DOCUMENTS

| 10,475,183 B2 * | 11/2019 | Kawaguchi ............... G06T 1/00 |
| 2011/0274340 A1 | 11/2011 | Suzuki et al. |
| 2020/0372649 A1 | 11/2020 | Nakane et al. |

FOREIGN PATENT DOCUMENTS

| CA | 3010836 | * | 2/2012 | ........... G06V 20/698 |
| EP | 3951386 A1 | | 2/2022 | |

(Continued)

OTHER PUBLICATIONS

Mosquera-Lopez, C., et al., "Computer-aided Prostate Cancer Diagnosis from Digitized Histopathology: A Review on Texture-based Systems," IEEE Rev. Biomed. Eng., 8:98-113 (2014).
(Continued)

*Primary Examiner* — Jerome Grant, II
(74) *Attorney, Agent, or Firm* — Harness Dickey & Pierce P.L.C.

(57) ABSTRACT

The degree of differentiation of a cell in tissue is precisely determined. An estimating device (1) includes: a binarizing section (41) configured to generate binarized images from an image obtained by capturing an image of tissue; a Betti number calculating section (42) configured to calculate, for each binarized image, (i) the number of hole-shaped regions (b1) each surrounded by pixels of a first pixel value and each composed of pixels of a second pixel value, (ii) the number of connected regions each composed of the pixels of the first pixel value connected together, and (iii) a ratio (R) between (i) and (ii); a statistic calculating section (43) configured to calculate statistics of the calculated numbers (b1, b0) and ratio (R); and an estimating section (44) configured to feed input data including the calculated statistics to a trained estimating model to output the degree of differentiation of the cell in tissue.

15 Claims, 10 Drawing Sheets

(52) U.S. Cl.
CPC .............. *G06T 2207/20081* (2013.01); *G06T 2207/30024* (2013.01); *G06T 2207/30096* (2013.01)

(58) Field of Classification Search
CPC . G06T 2207/10024; G06T 2207/10056; G06T 2207/20076; G06T 2207/20084; G06T 2207/30081; G06T 2207/30242; G06T 7/0012; G06T 7/11; G06T 7/136; G06T 7/194; G06F 18/23213; G06N 20/00; G06V 10/25; G06V 10/267; G06V 10/28; G06V 10/50; G06V 10/764; G06V 10/774; G06V 20/69
USPC ......................................................... 382/128
See application file for complete search history.

(56) References Cited

FOREIGN PATENT DOCUMENTS

| | | | | | |
|---|---|---|---|---|---|
| JP | 2004054530 | * | 2/2004 | ............... | G06K 7/00 |
| JP | 2019518224 | * | 6/2019 | ........... | G06T 7/0012 |
| WO | WO2010087112 | * | 8/2010 | ........... | G06V 20/698 |
| WO | WO-2010087112 A1 | | 8/2010 | | |
| WO | WO2019102829 | * | 5/2019 | ........... | A61B 6/5217 |
| WO | WO-2019102829 A1 | | 5/2019 | | |
| WO | WO-2020195258 A1 | | 10/2020 | | |

OTHER PUBLICATIONS

Office Action from corresponding Japanese Application No. 2020-219604 dated Feb. 1, 2022.

* cited by examiner

FIG. 4
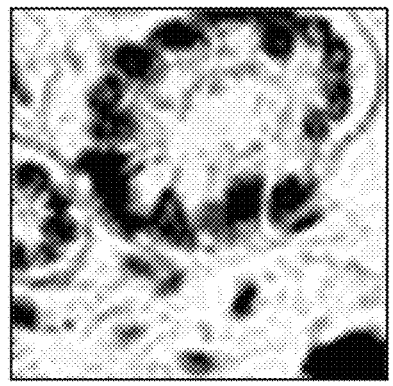
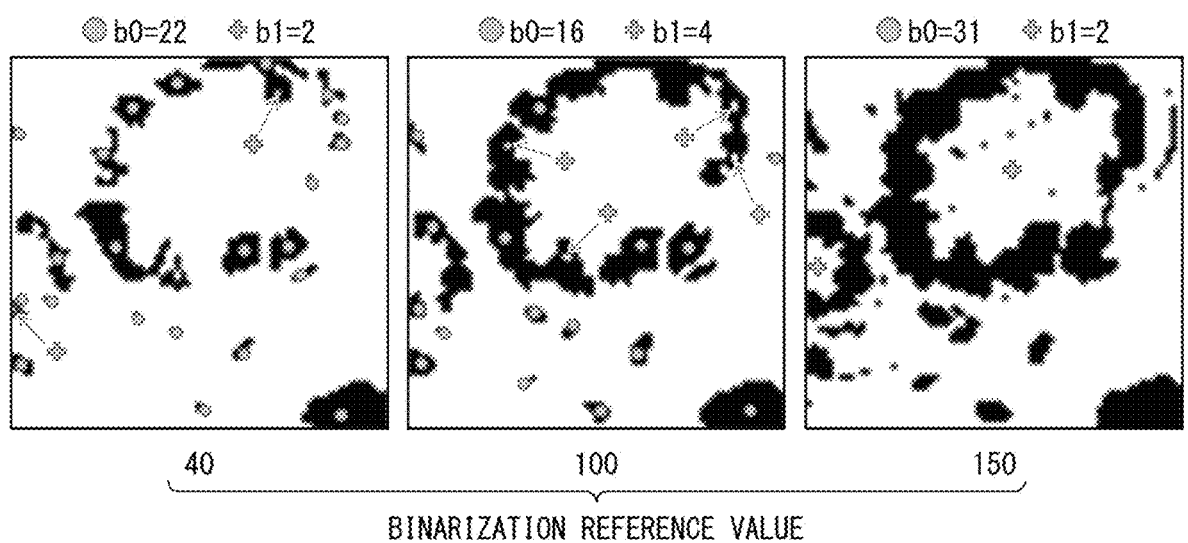

| TRAINING HISTOLOGICAL IMAGE ID | HISTOLOGICAL IMAGE | DIFFERENTIATION INFORMATION |
|---|---|---|
| T1 | | |
| T2 | | |
| T3 | | |
| ... | ... | ... |

| ANALYSIS METHOD | AUC | ACCURACY | RECALL | PRECISION | SPECIFICITY | F1 SCORE |
|---|---|---|---|---|---|---|
| DLGg | 0.91 | 85.04% | 0.72 | 0.90 | 0.94 | 0.80 |
| SSAE | 0.79 | 72.07% | 0.65 | 0.73 | 0.79 | 0.69 |
| MATF | 0.94 | 86.41% | 0.84 | 0.87 | 0.89 | 0.85 |
| SRHP | 0.96 | 89.02% | 0.94 | 0.84 | 0.84 | 0.89 |

IMAGE ANALYSIS METHOD, ESTIMATING DEVICE, ESTIMATING SYSTEM, AND STORAGE MEDIUM

This Nonprovisional application claims priority under 35 U.S.C. § 119 on Patent Application No. 2020-219604 filed in Japan on Dec. 28, 2020, the entire contents of which are hereby incorporated by reference.

TECHNICAL FIELD

The present invention relates to an image analysis method, an estimating device, and the like each of which is for analyzing a histological image obtained by capturing an image of tissue of a human body to estimate the degree of differentiation of a cell in the tissue.

BACKGROUND ART

Expert pathologists diagnose tumors developing in tissue taken from the body of a subject (for example, a patient) on the basis of a histological image of the tissue. However, some pathological indicators relating to the degree of differentiation of a cell included in tissue are difficult to discriminate simply by visually examining the histological image.

To overcome the difficulty, a variety of computerized image analysis methods have been devised. Non-Patent Literature 1 discusses a plurality of different approaches for detecting and grading prostate cancer.

CITATION LIST

Non-Patent Literature

Non-Patent Literature 1
C. Mosquera-Lopes et al., "Computer-aided prostate cancer diagnosis from binarized histopathology: a review on texture-based systems." IEEE Rev. Biomed. Eng. Vol 8, pp 98-113, 2014

SUMMARY OF INVENTION

Technical Problem

Pathologists have knowledge about structural property, arrangement, and infiltration manner of tumor cells developing in tissue and also have knowledge about how the tumors developing in tissue are imaged in histological images. With the above knowledge, pathologists determine the degree of differentiation of a cell in tissue on the basis of histological images.

For example, when Gleason's grade, which is an indicator used for pathological diagnosis of prostate cancer, is applied, prostate cancer is graded into any one of five different grades from grade 1 representing the mildest disease condition to grade 5 representing the most severe disease condition. Although the degree of gland differentiation is the strongest determinant of Gleason's grade, manual grading through pathologists' eyes is subjective, and in particular, discrimination between grades 3 and 4, which reflect moderate disease conditions, is a time-consuming task even for expert pathologists, and often involves inter-reader variability among pathologists.

The various image analysis methods disclosed in Non-Patent Literature 1 are proposed to improve such a situation, but have a room for improvement in accuracy and reliability of determination results.

An aspect of the present invention implements an image analysis method, an estimating device, and the like each of which is for precisely determining the degree of differentiation of a cell included in tissue.

Solution to Problem

<1> To solve the above problem, an image analysis method in accordance with an aspect of the present invention is an image analysis method of analyzing a histological image obtained by capturing an image of tissue, the method including: a binarization step of generating, from the histological image, a plurality of binarized images associated with respective binarization reference values different from each other; a characteristic numerical value calculation step of calculating, for each of the plurality of binarized images, (i) a first characteristic numerical value representing the number of hole-shaped regions each surrounded by pixels of a first pixel value and each composed of pixels of a second pixel value, the first and second pixel values given through binarization, (ii) a second characteristic numerical value representing the number of connected regions each composed of the pixels of the first pixel value connected together, and (iii) a third characteristic numerical value representing a ratio between the first characteristic numerical value and the second characteristic numerical value; a statistic calculation step of calculating a first statistic relating to a distribution of the first characteristic numerical value calculated for each of the binarized images, a second statistic relating to a distribution of the second characteristic numerical value calculated for each of the binarized images, and a third statistic relating to a distribution of the third characteristic numerical value calculated for each of the binarized images; and an estimation step of feeding input data including the first statistic, the second statistic, and the third statistic to an estimating model that simulates a correspondence of the first statistic, the second statistic, and the third statistic to a degree of differentiation of a cell included in the tissue, and outputting the degree of differentiation of the cell included in the tissue.

<7> An image analysis device in accordance with an aspect of the present invention includes: a binarizing section configured to generate, from a histological image obtained by capturing an image of tissue, a plurality of binarized images associated with respective binarization reference values different from each other; a characteristic numerical value calculating section configured to calculate, for each of the plurality of binarized images, (i) a first characteristic numerical value representing the number of hole-shaped regions each surrounded by pixels of a first pixel value and each composed of pixels of a second pixel value, the first and second pixel values given through binarization, (ii) a second characteristic numerical value representing the number of connected regions each composed of the pixels of the first pixel value connected together, and (iii) a third characteristic numerical value representing a ratio between the first characteristic numerical value and the second characteristic numerical value; and a statistic calculating section configured to calculate a first statistic relating to a distribution of the first characteristic numerical value calculated for each of the binarized images, a second statistic relating to a distribution of the second characteristic numerical value calculated for each of the binarized images, and a third statistic relating to a distribution of the third characteristic numerical value calculated for each of the binarized images.

<10> An estimating device in accordance with an aspect of the present invention includes an estimating section configured to obtain the first statistic, the second statistic, and the third statistic from an image analysis device described in <7> above, feed input data including the first statistic, the second statistic, and the third statistic to an estimating model that simulates a correspondence of the first statistic, the second statistic, and the third statistic to a degree of differentiation of a cell included in the tissue, and output the degree of differentiation of the cell included in the tissue.

<11> Alternatively, an estimating device in accordance with an aspect of the present invention includes: a binarizing section configured to generate, from a histological image obtained by capturing an image of tissue, a plurality of binarized images associated with respective binarization reference values different from each other; a characteristic numerical value calculating section configured to calculate, for each of the plurality of binarized images, (i) a first characteristic numerical value representing the number of hole-shaped regions each surrounded by pixels of a first pixel value and each composed of pixels of a second pixel value, the first and second values given through binarization, (ii) a second characteristic numerical value representing the number of connected regions each composed of the pixels of the first pixel value connected together, and (iii) a third characteristic numerical value representing a ratio between the first characteristic numerical value and the second characteristic numerical value; a statistic calculating section configured to calculate a first statistic relating to a distribution of the first characteristic numerical value calculated for each of the binarized images, a second statistic relating to a distribution of the second characteristic numerical value calculated for each of the binarized images, and a third statistic relating to a distribution of the third characteristic numerical value calculated for each of the binarized images; and an estimating section configured to feed input data including the first statistic, the second statistic, and the third statistic to an estimating model that simulates a correspondence of the first statistic, the second statistic, and the third statistic to a degree of differentiation of a cell included in the tissue, and output the degree of differentiation of the cell included in the tissue.

<14> An estimating system in accordance with an aspect of the present invention includes: an image analysis device described in <7> above; an estimating device described in <10> above; an external device configured to send the histological image to the image analysis device; and a presenting device configured to obtain an estimation result output from the estimating device to present the estimation result.

<14> An estimating system in accordance with an aspect of the present invention includes an image analysis device described in <7> above; an estimating device described in <10> above; an external device configured to send the histological image to the estimating device; and a presenting device configured to obtain an estimation result output from the estimating device to present the estimation result.

The estimating device and the image analysis device in accordance with aspects of the present invention may be implemented with a computer. In this case, (i) a control program for the estimating device for causing the computer to implement the estimating device by causing the computer to operate as each section (software component) of the estimating device and (ii) a computer readable storage medium storing the control program also fall within the scope of the present invention.

Advantageous Effects of Invention

An aspect of the present invention enables precise determination of the degree of differentiation of a cell included in tissue.

BRIEF DESCRIPTION OF DRAWINGS

FIG. 4 is a view illustrating example binarized images generated from a histological image, and example zero-dimensional and one-dimensional Betti numbers calculated for the respective binarized images.

DESCRIPTION OF EMBODIMENTS

Embodiment 1

Figure 1:
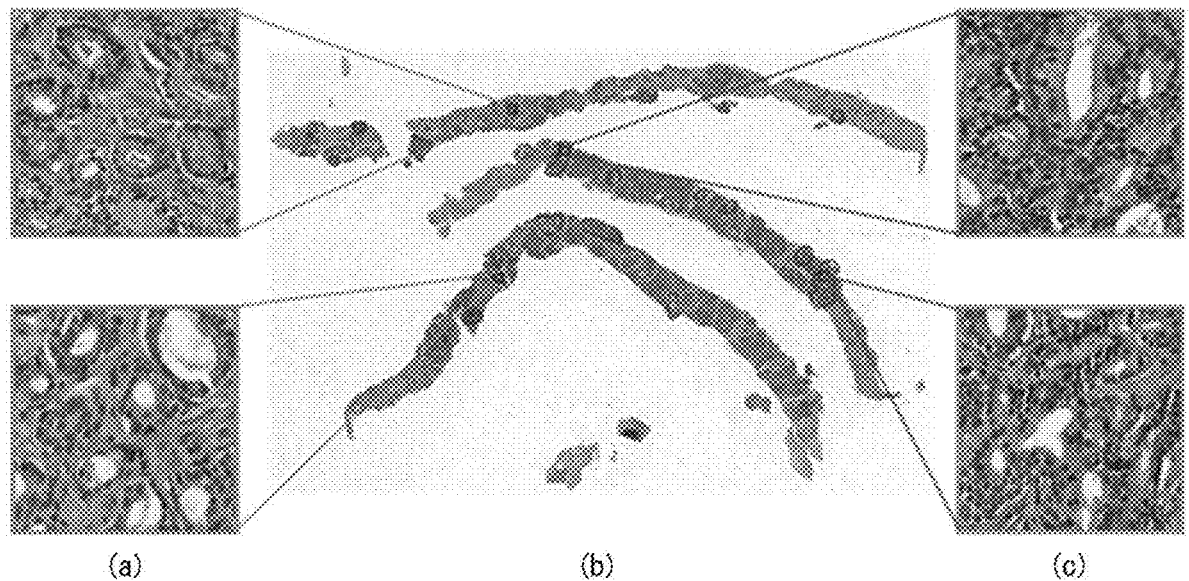
FIG. 1 is a view illustrating an example histological image, in which (b) of FIG. 1 is a view illustrating the entire needle biopsy image of a prostate, and (a) and (c) of FIG. 1 are views illustrating magnified image patches of moderate-grade prostate cancerous regions extracted from the needle biopsy image illustrated in (b) of FIG. 1.

The following description will discuss an embodiment of the present invention in detail.

Technical Idea of the Present Invention

First, the technical idea of an image analysis method in accordance with an aspect of the present invention will be described below.

When Gleason's grade is applied, prostate cancer can be graded into any one of five different grades from grade 1 representing the mildest disease condition to grade 5 representing the most severe disease condition. The degree of differentiation of the glands in a prostate (tissue) is the strongest determinant of Gleason's grade. The degree of differentiation of a cell included in a prostate may be a pathological indicator associated with the structure of a tumor and the degree of infiltration of the tumor. For example, even expert pathologists need to carefully examine needle biopsy images of a prostate (hereinafter, referred to as needle biopsy images) to correctly discriminate grades representing moderate disease conditions on the basis of the needle biopsy images. This makes the diagnosis time-consuming and may result in disagreement on the diagnosis among pathologists.

The inventors of the present invention selected, as an analysis target, a needle biopsy image, which is an example of a histological image, and made detailed comparison and study of the region where prostate cancer developed to the region where no prostate cancer developed in the needle biopsy image (histological image). The inventors of the present invention applied the concept of homology to describe the topological arrangement of the nuclei of the cells associated with the gland lumen and quantify the degree of gland differentiation in a needle biopsy slide of prostate cancer.

More specifically, the inventors of the present invention extracted, from a needle biopsy image, an image patch (histological image) in which an analysis target region is captured, and generated, for the image patch, a plurality of binarized images associated with binarization reference values different from each other. The inventors of the present invention then calculated, for each binarized image, a one-dimensional Betti number b1 (first characteristic numerical value) and a zero-dimensional Betti number b0 (second characteristic numerical value), and a ratio R between the one-dimensional Betti number b1 and the zero-dimensional Betti number b0 (third characteristic numerical value). The ratio R may be b1/b0 or b0/b1. In this manner, the inventors of the present invention obtained (1) a one-dimensional Betti number b1 group, (2) a zero-dimensional Betti number b0 group, and (3) a ratio R group for a binarized image group generated from the needle biopsy image.

Subsequently, the inventors of the present invention regarded, as discrete probability distributions, (1) the one-dimensional Betti number b1 group, (2) the zero-dimensional Betti number b0 group, and (3) the ratio R group, and calculated statistics for the respective distributions. The set of these statistics calculated for the same needle biopsy image is considered to be a characteristic vector representing the characteristics of topological arrangement of the nuclei of cells included in tissue captured in the needle biopsy image.

The inventors of the present invention have found that the degree of differentiation of a gland captured in each needle biopsy image can be precisely determined on the basis of the statistics calculated in this manner, and have completed the invention of an image analysis method in accordance with an aspect of the present invention. For example, applying the image analysis method in accordance with an aspect of the present invention enables precise discrimination of grades 1 to 5 of Gleason's grade, which represents the disease conditions of prostate cancer, on the basis of a needle biopsy image.

In some cases, it is not easy even for expert pathologists to discriminate between grades 3 and 4 of Gleason's grade, which represent moderate-grade disease conditions. Applying the image analysis method in accordance with an aspect of the present invention enables precise discrimination between the grades 3 and 4 of Gleason's grade in a short time.

(Needle Biopsy Image and Gleason's Grade)

Referring now to FIG. 1, Gleason's grade which is performed through determination on the basis of a needle biopsy image is described. FIG. 1 is a view illustrating an example histological image, in which (b) of FIG. 1 is a view illustrating the entire needle biopsy image, and both (a) and (c) of FIG. 1 are views illustrating extracted image patches of the prostate cancerous regions.

The needle biopsy image illustrated in (b) of FIG. 1 is an image of a sample at 40-fold magnification. The sample was prepared by paraffin-embedding tissue sections taken from multiple points in a prostate taken from a subject, slicing them into thin pieces, and staining the thin pieces with Hematoxylin-Eosin (HE).

HE staining is one of the methods used to stain collected tissue sections, and uses staining with hematoxylin and staining with eosin together. Hematoxylin stains chromatin in a cell nucleus and ribosomes in cytoplasm purple-blue. Eosin stains the constituents of cytoplasm and an extracellular matrix red.

To make the locations of the nuclei of individual cells constituting a gland lumen in a histological image and the arrangement of the nuclei clearer, the histological image may undergo color deconvolution processing. Color deconvolution processing is performed to normalize color intensity by hematoxylin staining and color intensity by eosin staining. For example, when a histological image is represented with three color phases of RGB, a normalization factor matrix expressed by, for example, Expression (1) or Expression (2) shown below can be used. The normalization factor matrix of Expression (1) is the original stain matrix by Ruifrok et al., and the normalization factor matrix of Expression (2) is the average stain matrix calculated using adaptive estimation method by Macenko et al. In each normalization factor matrix, the first row (upper line) is the normalization factor relating to hematoxylin staining and the second row (lower line) is the normalization factor relating to eosin staining.

$$\begin{pmatrix} 0.644211 & 0.716556 & 0.266844 \\ 0.092789 & 0.954111 & 0.283111 \end{pmatrix} \begin{pmatrix} R \\ G \\ B \end{pmatrix} \quad \text{Expression (1)}$$

$$\begin{pmatrix} 0.5155 \pm 0.0307 & 0.7234 \pm 0.0169 & 0.4576 \pm 0.0205 \\ 0.1501 \pm 0.0200 & 0.7723 \pm 0.0308 & 0.6149 \pm 0.03911 \end{pmatrix} \begin{pmatrix} R \\ G \\ B \end{pmatrix} \quad \text{Expression (2)}$$

Both (a) and (c) of FIG. 1 are views illustrating image patches extracted from the needle biopsy image of (b) of FIG. 1 and representing the regions where prostate cancer in the moderate-grade disease condition develops. By way of example, two image patches are illustrated in each of (a) and (c) of FIG. 1. The image patches illustrated in (a) and (c) of FIG. 1 are images of the respective regions in the needle biopsy image illustrated in (b) of FIG. 1 at 40-fold magnification.

The analysis of the degree of differentiation of a cell in tissue in an image does not require assessment of the nuclei of individual cells but requires assessment of characteristics relating to topology and connectivity among the nuclei of a plurality of cells. When such analysis targets at an image patch, the patch size may be 160×160 pixels at 10-fold magnification.

The prostate in a needle biopsy image may locally include prostate cancerous regions. The local regions in the needle biopsy image are determined to be analyzed and the grades of Gleason's grade may be assigned to the local regions. To conduct such analysis, a plurality of image patches that can be the analysis targets may be extracted from the needle biopsy image.

To remove the background region that does not include tissue from the needle biopsy image, any known algorithm can be used. Examples of such an algorithm include OTSU algorithm (Otsu, 1979, IEEE Trans. Syst. Man. Cybern. Vol. 9 (1), p 62-66, doi:10.1109/tsmc.1979.4310076). Further, to extract image patches, any trained neural network having an image recognition function can be used.

For example, the Gleason's grade of the entire prostate in the needle biopsy image can be estimated on the basis of the analysis result for the plurality of image patches extracted from the needle biopsy image. The extraction window for extracting the plurality of image patches from the needle biopsy image may be moved across each region of the needle biopsy image row by row from the upper left to the lower right with a predetermined step size. When, for example, the extracted image patch is 160×160 pixels in size, the step size may be 80 pixels.

In the image patches illustrated in (a) of FIG. 1, the cell nuclei arrange in association with the gland lumen. On the other hand, in the image patches illustrated in (c) of FIG. 1, some cell nuclei arrange to form small holes, and other cell nuclei do not arrange in association with the gland lumens. Expert pathologists determine the regions in the image patches illustrated in (a) of FIG. 1 fall under grade 3 of Gleason's grade, and determine the regions in the image patches illustrated in (c) of FIG. 1 fall under grade 4 of Gleason's grade.

The histological image as used herein may be an image of a tissue section taken from the body of a subject. It should be noted that the image analysis method in accordance with an aspect of the present invention enables estimation of the degree of differentiation of a cell on the basis of a histological image in which a cell included in tissue taken from the body of a subject is captured, and the histological image is not limited to a needle biopsy image of a prostate. The image analysis method in accordance with an aspect of the present invention enables the analysis of a body part such as the alimentary canal, a liver, a pancreas, and a lymph node besides a prostate.

(Mathematical Representation for Histological Image Analysis)

The following is the description of mathematical representation used for histological image analysis in the image analysis method in accordance with an aspect of the present invention.

To quantify and analyze a change that has occurred in tissue, the concept of homology, in particular, the persistent homology is applied to binarized images in the image analysis method in accordance with an aspect of the present invention. Homology is one of mathematical fields which facilitates an analysis of, for example, connection between figures by substituting an algebraic expression for morphological characteristics of the figures.

The concept of homology is the mathematical concept that represents connection and contact among constituents. A histological image is binarized by using an appropriately set reference value for binarization (also referred to as binarization parameter). The binarized image is then used to calculate a zero-dimensional Betti number b0 and a one-dimensional Betti number b1. Use of calculated zero-dimensional Betti number b0 and one-dimensional Betti number b1 enables assessment of the degrees of connection and contact among the constituents of tissue.

Betti numbers are topological and suggestive numbers that have no relation with the shapes of figures (corresponding to, for example, constituents of tissue) but have relation only with contact and separation among figures. When a q-dimensional singular homology group is finitely-generated, the q-dimensional singular homology group is the direct sum of a free Abelian group and a finite Abelian group. The rank of the free Abelian group is referred to as a Betti number.

<Zero-Dimensional Betti Number b0>

A zero-dimensional Betti number b0 is mathematically defined as follows. In general, a zero-dimensional Betti number b0 refers to the number of connected components of a figure K composed of a finite number of line segments connected together (K is also referred to as one-dimensional complex). The expression "a figure composed of a finite number of points and a finite number of line segments connecting the points is a connection" means that it is possible to reach any second vertex from any first vertex of the figure by following a side of the figure.

For each of a plurality of binarized images generated using respective binarization reference values different from each other, the number of connected regions each composed of pixels that are connected together and have one of pixel values obtained by the binarization (for example, a pixel value of 0 as a result of binarization) is the zero-dimensional Betti number b0.

<One-Dimensional Betti Number b1>

A one-dimensional Betti number b1 is mathematically defined as follows. The one-dimensional Betti number b1 of figure K is r when K satisfies conditions (1) and (2) below. For figure K composed of a finite number of line segments connected together (a one-dimensional complex having connection), (1) when any given r one-dimensional simplices (for example, line segments) that are each open (each do not have both ends) are removed from figure K, the number of connected components of figure K does not increase; and (2) when any given (r+1) one-dimensional open simplices are removed from K, K no longer has connection (in other words, the number of connected components of K increases by 1).

For each of the plurality of binarized images generated using respective binarization reference values different from each other, the number of hole-shaped regions (composed of pixels having, for example, a pixel value of 255 after the binarization) each surrounded by pixels having one of the pixel values obtained by the binarization (for example, a pixel value of 0 as a result of the binarization) is the one-dimensional Betti number b1.

<Zero-Dimensional Betti Number b0 and One-Dimensional Betti Number b1 of Example Figure>

Figure 2:
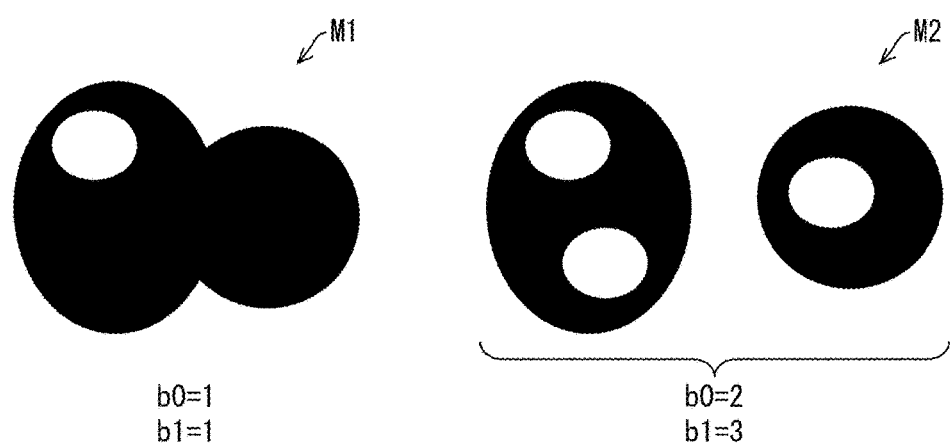
FIG. 2 is a schematic diagram for explaining Betti numbers in the concept of homology.

Now, the zero-dimensional Betti number b0 and the one-dimensional Betti number b1 in a binarized image are described using an example figure illustrated in FIG. 2. FIG. 2 is a schematic view for explaining Betti numbers in the concept of homology. For a figure M1 illustrated in FIG. 2, the number of black regions is one. Accordingly, the zero-dimensional Betti number b0 of the figure M1 is 1. In addition, the number of white regions in the figure M1 that are each surrounded by the black region is one. Accordingly, the one-dimensional Betti number b1 of the figure M1 is 1.

For a figure M2 illustrated in FIG. 2, the number of black regions is two. Accordingly, the zero-dimensional Betti number b0 of the figure M2 is 2. In addition, the number of white regions of the figure M2 that are each surrounded by the black regions is three. Accordingly, the one-dimensional Betti number b1 of the figure M2 is 3.

For a two-dimensional image, the zero-dimensional Betti number b0 is the number of cohesive groups each composed of components connected to each other, and the one-dimensional Betti number b1 is the number of voids (which can be referred to as "hole-shaped regions" hereinafter) each bounded by the connected components. The number of hole-shaped regions is the total number of the "holes" present in the connected components.

In the image analysis method in accordance with an aspect of the present invention, characteristics relating to topology and connectivity of the plurality of nuclei of cells are assessed for regions captured in histological images. With the image analysis method in accordance with an aspect of the present invention, this assessment enables estimation of the degree of cell differentiation based on the structural property and arrangement of the cells included in the tissue captured in the histological images. For example, applying the image analysis method in accordance with an aspect of the present invention to histological images such as needle biopsy images and image patches enables discrimination between the grades of Gleason's grade with a precision comparable to that achieved by expert pathologists (Configuration of Estimating System 100)

Figure 3:
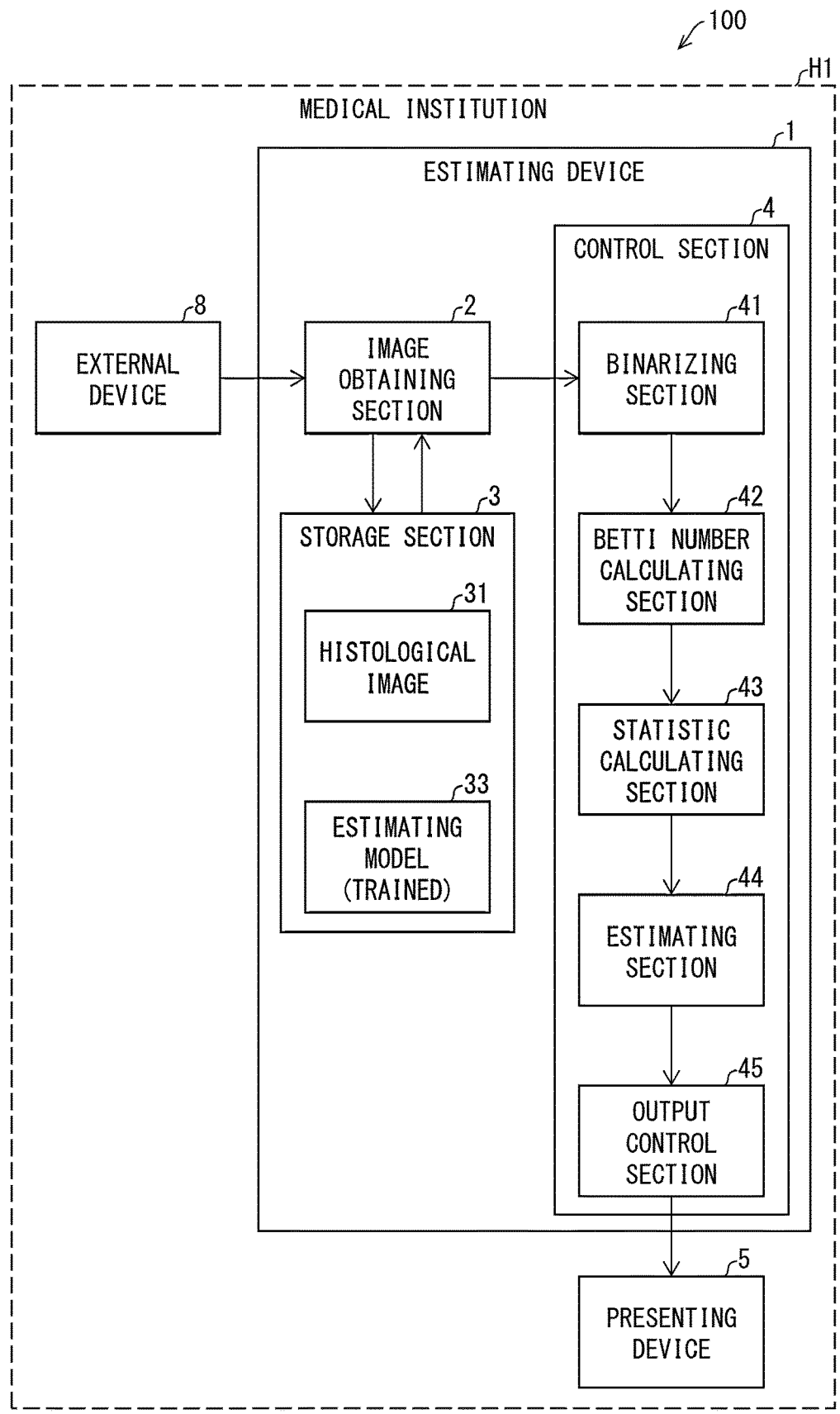
FIG. 3 is a functional block diagram illustrating an example configuration of an estimating system with an estimating device in accordance with an aspect of the present invention.

The following description will discuss a configuration of an estimating system 100 with reference to FIG. 3. FIG. 3 is a block diagram illustrating an example configuration of the estimating system 100. The estimating system 100 includes an estimating device 1 that performs the image analysis method in accordance with an aspect of the present invention.

The estimating system 100 includes the estimating device 1, an external device 8 that sends a histological image 31 to the estimating device 1, and a presenting device 5 that obtains an estimation result output from the estimating device 1 and presents the estimation result. FIG. 3 illustrates an example in which a medical institution H1 has introduced the estimating system 100.

The external device 8 may be, for example, a microscopic device having an image capturing function, or a computer connected to a microscope so that the computer can obtain image data from the microscope. Alternatively, the external device 8 may be a server (not illustrated) in the medical institution H1 that stores and manages various kinds of medical image data and pathological image data.

The presenting device 5 may be a device, such as a display and a speaker, capable of presenting information output from the estimating device 1. In an example, the presenting device 5 is a display included in the estimating device 1 or in the external device 8. Alternatively, the presenting device 5 may be a device, such as a computer and a tablet terminal, used by pathologists, laboratory technicians, and researchers from the medical institution H1.

A connection between the estimating device 1 and the external device 8 may be a wireless connection or a wired connection. A connection between the estimating device 1 and the presenting device 5 may be a wireless connection or a wired connection.

(Configuration of Estimating Device 1)

The estimating device 1 includes an image obtaining section 2, a storage section 3, and a control section 4. The histological image 31 and an estimating model 33 may be stored in the storage section 3. The estimating model 33 will be described later.

The image obtaining section 2 obtains the histological image 31 of tissue from the external device 8. When the analysis target is prostate tissue, the histological image 31 may be an image, captured at a predetermined magnification, of a tissue section of a prostate taken from the body of a subject. The image obtaining section 2 may obtain, from the external device 8, an image patch corresponding to the region extracted from the histological image 31. The image obtaining section 2 may store the obtained histological image 31 in the storage section 3 as illustrated in FIG. 3.

Although FIG. 3 illustrates the example in which the estimating device 1 obtains the histological image 31 from the external device 8 that is separate from the estimating device 1, the present invention is not limited to such a configuration. For example, the estimating device 1 may be incorporated into the external device 8.

The storage section 3 stores, in addition to the histological image 31, a control program, executed by the control section 4, for controlling each section, an OS program, an application program, and the like. Further, the storage section 3 stores various data that is retrieved when the control section 4 executes the program. The storage section 3 is constituted by a non-volatile storage device such as a hard disk and a flash memory. Note that the estimating device 1 may include, in addition to the storage section 3, a volatile storage device, such as a Random Access Memory (RAM), used as a working area for temporary storage of data in the process of the execution of the various kinds of programs described above.

Although FIG. 3 illustrates an example in which the estimating device 1 is connected to the presenting device 5 that is separate from the estimating device 1, the present invention is not limited to such a configuration. For example, the estimating device 1 may include the presenting device 5 for the exclusive use.

<Configuration of Control Section 4>

The control section 4 may be constituted by a control device such as a central processing unit (CPU) and a dedicated processor. The respective units of the control section 4, which will be described later with reference to FIG. 3, are implemented by causing the control device such as a CPU to retrieve a program stored in the storage section 3 embodied in the form of, for example, a read only memory (ROM) and store the program in, for example, a random access memory (RAM) for execution.

The control section 4 analyzes the histological image 31, which is the analysis target, to estimate the degree of differentiation of a cell included in the tissue captured in the histological image 31 and outputs the estimation result. The control section 4 includes a binarizing section 41, a Betti number calculating section 42 (characteristic numerical value calculating section), a statistic calculating section 43, an estimating section 44, and an output control section 45.

[Binarizing Section 41]

The binarizing section 41 performs binarization processing on the histological image 31 to generate a plurality of binarized images associated with respective binarization reference values different from each other.

The binarizing section 41 may have a known image recognition function and image processing function. This allows the binarizing section 41 to clip, from the histological image 31, the region in which the analysis target tissue is captured, perform color deconvolution processing on the histological image 31, and/or divide the histological image 31 to generate a plurality of image patches. For example, the binarizing section 41 may discriminate the region in which tissue is captured from the region surrounding the tissue region (for example, the region in which resin is captured) and clip the tissue region.

In the binarization processing, the binarizing section 41 converts a pixel with a pixel value larger than a binarization reference value to a white pixel, and converts a pixel with a pixel value not larger than the binarization reference value to a black pixel. In doing so, the binarizing section 41 performs binarization processing every time the binarization reference value changes, to generate a plurality of binarized images. In other words, the binarizing section 41 generates a plurality of binarized images associated with respective binarization reference values different from each other for the histological image 31.

In an example, the binarizing section 41 sets the binarization reference value to a value of not less than 0 and not more than 255. For example, when the binarization reference value is set to a pixel value of 100, the pixel value of a pixel having a pixel value of not more than 100 is converted to 0 as a result of the binarization processing, and the pixel value of a pixel having a pixel value of higher than 100 is converted to 255 as a result of the binarization processing. In an example, the binarizing section 41 may generate 255 binarized images for each histological image by changing the binarization reference value from 1 to 255 by an increment of 1. Alternatively, the binarizing section 41 may generate 253 binarized images for each histological image by changing the binarization reference value from 2 to 254 by an increment of 1. Instead, the binarizing section 41 may generate 50 binarized images for each histological image by changing the binarization reference value from 2 to 254 by an increment of 5. The present invention is not limited to such a binarized image generation manner, provided that the binarizing section 41 may generate a plurality of binarized images for each histological image by changing the binarization reference value according to a desired rule.

[Betti Number Calculating Section 42]

The Betti number calculating section 42 calculates, for each binarized image, (i) a one-dimensional Betti number $b1$ representing the number of hole-shaped regions each surrounded by pixels having one of the pixel values given through binarization (hereinafter, referred to as a first pixel value) and each composed of pixels with the other pixel value given through the binarization (hereinafter, referred to as a second pixel value). Further, the Betti number calculating section 42 calculates (ii) a zero-dimensional Betti number $b0$ representing the number of connected regions each composed of pixels having the first pixel value connected together and (iii) the ratio R between the one-dimensional Betti number $b1$ and the zero-dimensional Betti number $b0$. Although the ratio R is $b1/b0$ in the example discussed below, the ratio R may be $b0/b1$.

Each of the above connected regions is a region composed of pixels that have a pixel value of, for example, 0 after binarization processing and are connected together. The connected regions are each surrounded by the pixels having a pixel value of 255 after the binarization processing, and are independent of each other.

On the other hand, each of the above hole-shaped regions is a region composed of pixels that have a pixel value of 255 after the binarization processing and are connected to each other. The hole-shaped regions are each surrounded by the pixels having a pixel value of 0 after the binarization processing, and are independent of each other.

When, for example, 255 binarized images are generated for each histological image by changing the binarization reference value from 1 to 255 by an increment of 1, the Betti number calculating section 42 calculates 255 one-dimensional Betti numbers $b1$, 255 zero-dimensional Betti numbers $b0$, and 255 ratios R.

FIG. 4 is a view illustrating example binarized images generated from the histological image 31, and an example zero-dimensional Betti number $b0$ and an example one-dimensional Betti number $b1$ calculated for each binarized image. In an example, for the binarized image in FIG. 4 that is generated using a binarization reference value of 40, the calculated zero-dimensional Betti number $b0$ is 22 and the calculated one-dimensional Betti number $b1$ is 2 (the ratio R is thus 11). Similarly, for the binarized image generated using a binarization reference value of 100, the calculated zero-dimensional Betti number $b0$ is 16, and the calculated one-dimensional Betti number $b1$ is 4 (the ratio R is thus 4). Further, for the binarized image generated using a binarization reference value of 150, the calculated zero-dimensional Betti number $b0$ is 31, and the calculated one-dimensional Betti number $b1$ is 2 (the ratio R is thus 15.5).

Note that values of the one-dimensional Betti number $b1$ and zero-dimensional Betti number $b0$ calculated by the Betti number calculating section 42 depend on magnification and resolution set at the time of obtaining the histological image 31 and on the area of a region imaged in the histological image 31. Accordingly, the Betti number calculating section 42 preferably calculates the one-dimensional Betti numbers $b1$ and the zero-dimensional Betti numbers $b0$ for respective histological images 31 that are at the same magnification and have the same resolution, and that have the same area of an imaged region.

An existing program can be used for the Betti number calculating section 42. Examples of such a program may include CHomP. CHomP is freeware compliant with General Public License (GNU). However, the program is not limited to CHomP, and programs other than CHomP may be used, provided that the programs can calculate the zero-dimensional Betti number $b0$ and the one-dimensional Betti number $b1$ relating to an image.

[Statistic Calculating Section 43]

FIG. 3 is referred to again. The one-dimensional Betti number $b1$, the zero-dimensional Betti number $b0$, and the ratio R have been calculated for each of the plurality of binarized images. The statistic calculating section 43 then calculates a first statistic T1 relating to the distribution of the one-dimensional Betti number $b1$, a second statistic T2 relating to the distribution of the zero-dimensional Betti number $b0$, and a third statistic T3 relating to the distribution of the ratio R.

When, for example, the Betti number calculating section 42 calculates 255 one-dimensional Betti numbers $b1$, the statistic calculating section 43 deals with the 255 one-dimensional Betti numbers $b1$ as one discrete probability distribution to calculate the first statistic T1 relating to the discrete probability distribution. Similarly, the statistic calculating section 43 deals with the 255 zero-dimensional Betti numbers $b0$ as one discrete probability distribution to calculate the second statistic T2 relating to the discrete probability distribution, and deals with the 255 ratios R as one discrete probability distribution to calculate the third statistic T3 relating to the discrete probability distribution.

The statistic calculating section 43 may calculate at least one of an average value, a median value, a standard deviation, a distribution range, a variation coefficient, skewness, and kurtosis as each of the first statistic T1, the second statistic T2, and the third statistic T3.

The distribution range is the difference between the maximum value and the minimum value. The variation coefficient is a value obtained by dividing the standard deviation by the average value. The skewness is the statistic representing the degree to which a distribution is skewed with respect to the normal distribution and thus is the indicator representing the degree and the magnitude of asymmetry between two halves of the distribution divided at the average value of the distribution. The kurtosis is the statistic representing the degree to which a distribution is sharp when compared to the normal distribution and thus is the indicator representing the degree of sharpness of the distribution.

[Estimating Section 44]

The estimating section 44 feeds input data including the first statistic T1, the second statistic T2, and the third statistic T3 to an estimating model 33 (described later), and outputs the degree of differentiation of a cell included in tissue. The degree of differentiation may be a value or an indicator, representing the degree of differentiation calculated on the basis of structural property, arrangement, and infiltration manner of a tumor cell developing in tissue. When the analysis target is prostate tissue, the degree of differentiation may be a value representing any of grades of Gleason's grade which is determined according to the degree of gland differentiation of the prostate. The estimating model 33 is a model that simulates a correspondence of the first statistic T1, the second statistic T2, and the third statistic T3 with the degree of differentiation of a cell included in tissue. In other words, the estimating model 33 is created through machine learning using, as learning data, a combination of the following (1) and (2):

(1) a training histological image 32 that is an image obtained by capturing an image of tissue and that has been given in advance differentiation information indicating the degree of differentiation of a cell included in tissue captured in the training histological image; and (2) the first statistic T1, the second statistic T2, and the third statistic T3 which are calculated for each of a plurality of binarized images that are generated from the training histological image 32 and that are associated with respective binarization reference values different from each other.

Machine learning processing using the training histological image 32 to create the estimating model 33 will be described later.

[Output Control Section 45]

The output control section 45 causes the presenting device 5 to present information indicating the estimation result output from the estimating section 44. Further, the output control section 45 may cause the presenting device 5 to present the histological image 31, which is the analysis target, together with the information indicating the estimation result.

Alternatively, the output control section 45 may be configured to control the presenting device 5 to present the estimation result for a region extracted from the histological image 31 at the position corresponding to the region in the histological image 31. This allows the estimating device 1 to present, to pathologists, laboratory technicians, and researchers, the output an estimation result for the histological image 31 and the position of a region associated with the estimation result.

The estimation result may be presented to a user in a desired manner. For example, a determination result may be displayed on the presenting device 5 as illustrated in FIG. 3, or may be output from a printer (not illustrated), a speaker (not illustrated), or the like.

(Processing Performed by Estimating Device 1)

Figure 5:
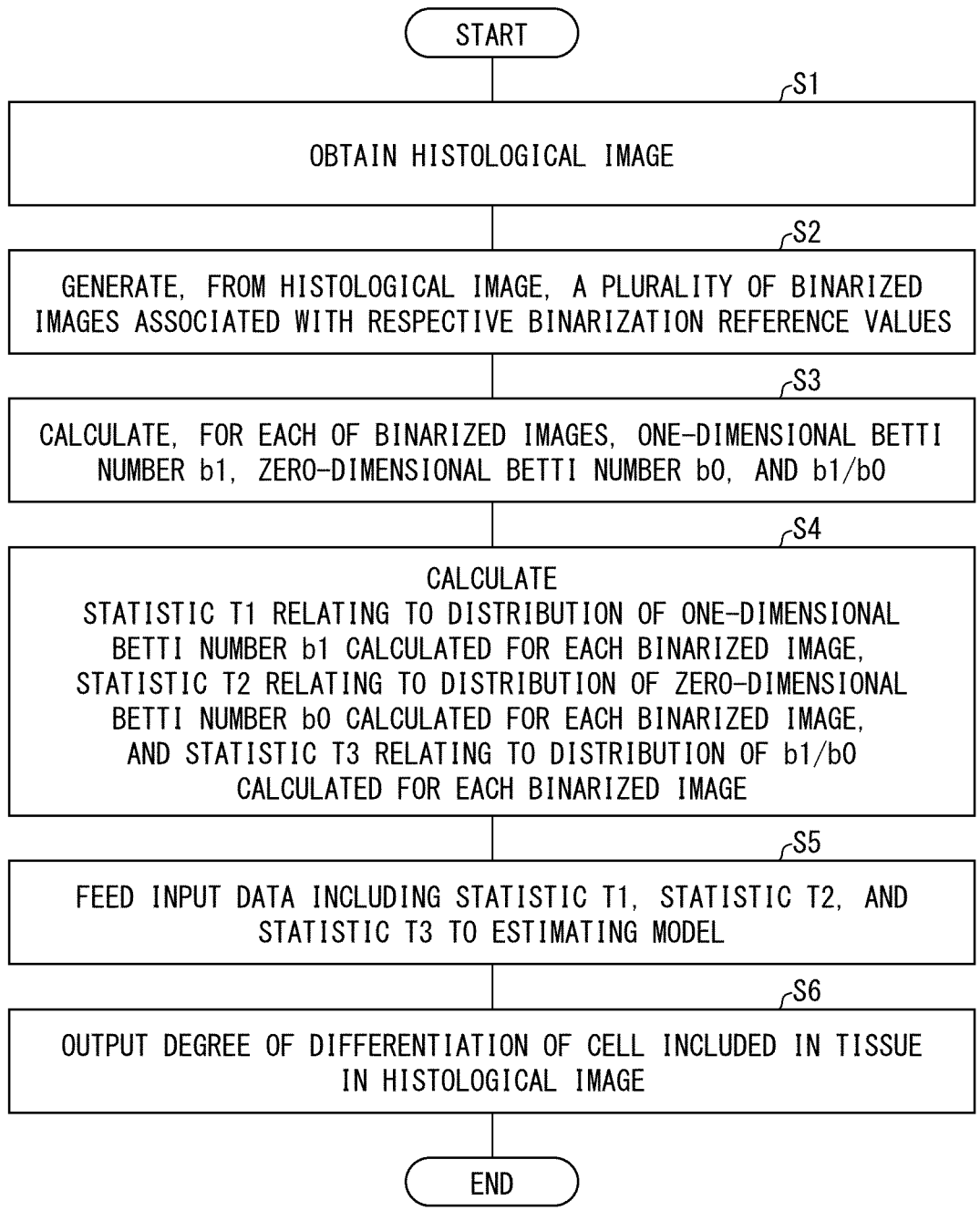
FIG. 5 is a flowchart illustrating an example flow of the processing performed by the estimating device.

The following description will discuss the processing performed by the estimating device 1 with reference to FIG. 5. FIG. 5 is a flowchart illustrating an example flow of the processing performed by the estimating device 1.

First, the image obtaining section 2 obtains the histological image 31 from the external device 8 (step S1).

Next, the binarizing section 41 generates, from the histological image 31, a plurality of binarized images associated with the respective binarization reference values different from each other (step S2).

The Betti number calculating section 42 then calculates the one-dimensional Betti number b1, the zero-dimensional Betti number b0, and the ratio R for each of the plurality of binarized images (step S3: a characteristic numerical value calculation step). The ratio R is denoted as "b1/b0" in FIG. 5.

The statistic calculating section 43 calculates a statistic T1 relating to the distribution of the one-dimensional Betti number b1 calculated for the respective binarized image, a statistic T2 relating to the distribution of the zero-dimensional Betti number b0 calculated for the respective binarized image, and a statistic T3 relating to the distribution of the ratio R calculated for the respective binarized images (step S4: statistic calculation step).

The estimating section 44 then feeds input data including the statistic T1, the statistic T2, and the statistic T3 to the estimating model 33 (step S5: an estimation step), and outputs the degree of differentiation of a cell included in the tissue captured in the histological image 31 (step S6: an estimation step).

With the above configuration, the estimating device 1 generates, for the histological image 31, the plurality of binarized images associated with the respective binarization reference values different from each other, and calculates the one-dimensional Betti number b1, the zero-dimensional Betti number b0, and the ratio R for each binarized image. The estimating device 1 then calculates the first statistic T1 relating to the distribution of the one-dimensional Betti number b1, the second statistic T2 relating to the distribution of the zero-dimensional Betti number b0, and the third statistic T3 relating to the distribution of the ratio R. Subsequently, the estimating device 1 feeds, as a data set, the first statistic T1, the second statistic T2, and the third statistic T3 to the estimating model 33, and outputs the degree of differentiation of a cell included in the tissue. This allows the estimating device 1 to precisely determine the degree of differentiation of a cell included in the tissue in the histological image 31 on the basis of the structural property of the cell included in the tissue.

Cells in tissue vary in uniformity of shape and size according to the degree of differentiation. In the above method, the property of the histological image 31 of the tissue is mathematically analyzed using the concept of homology, and the degree of differentiation of a cell included in the tissue is estimated on the basis of the analysis result. The estimation result is output from the estimating model 33 created through machine learning using the training histological image 32, which will be described later. Therefore, as with the pathological diagnosis results by pathologists, the estimation result is based on the property of the histological image 31. Accordingly, the estimation result can be understood in the same manner as determination results by pathologists, and are highly reliable.

(Training Histological Image 32)

Figures 6, 7:
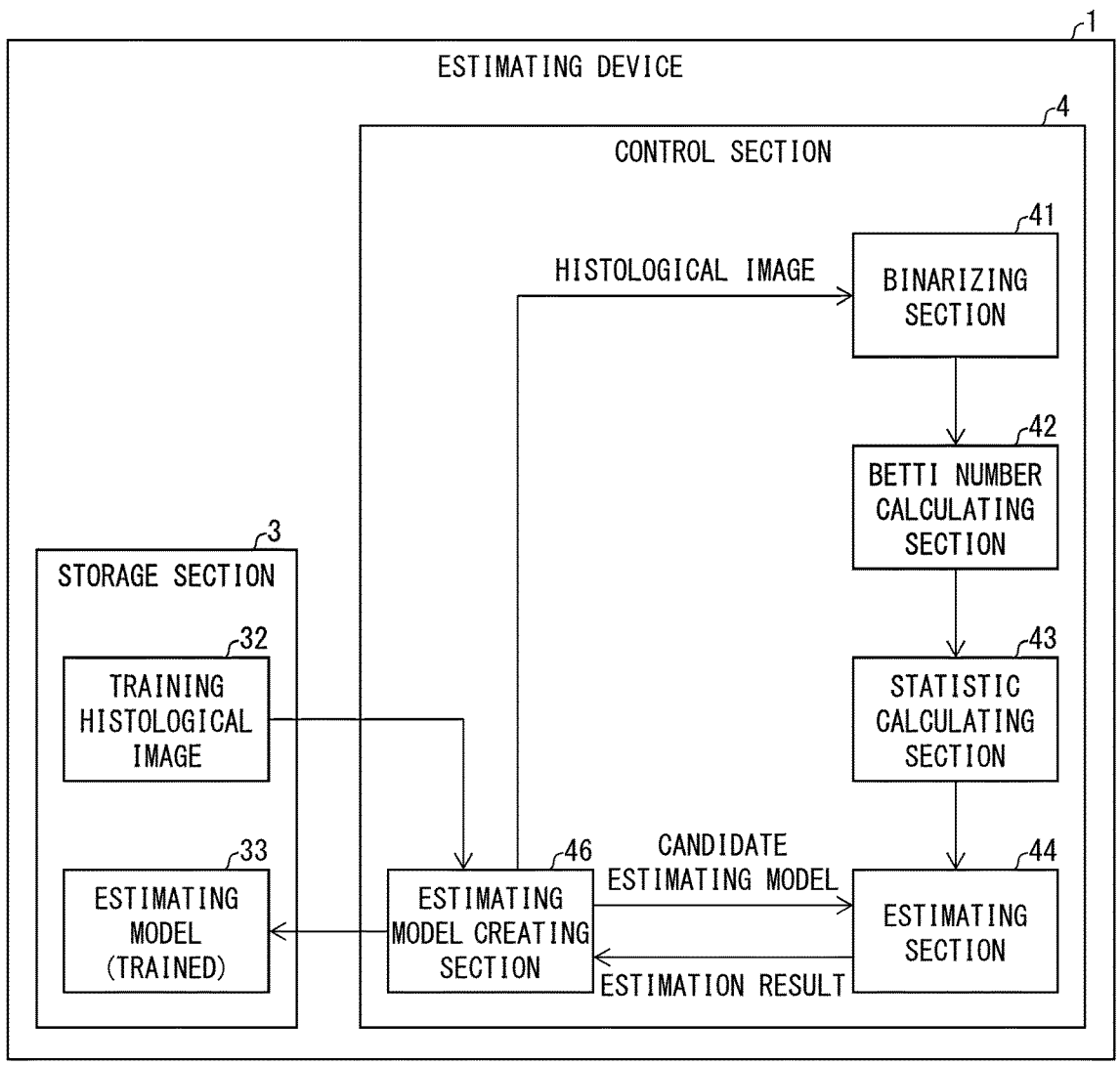
FIG. 6 is a view illustrating an example data structure of a training histological image.
FIG. 7 is a functional block diagram illustrating an example configuration of the main part of the estimating device that generates an estimating model.

The training histological image 32 may be used to create the estimating model 33. FIG. 6 is a view illustrating an example data structure of the training histological image 32.

As illustrated in FIG. 6, the training histological image 32 includes histological images of tissue taken from the bodies of subjects. The respective histological images are given training histological image IDs. Each histological image included in the training histological image 32 has been given in advance differentiation information that indicates the degree of differentiation of a cell included in the tissue. The differentiation information is a result of determination made by a pathologist who has examined the histological image included in the training histological image 32, and is information indicating the degree of differentiation of a cell included in the tissue.

(Configuration of Estimating Device 1 Having Function of Creating Estimating Model 33)

The following description will discuss the configuration of the estimating device 1 that is running a learning algorithm for creating the estimating model 33 with reference to FIG. 7. FIG. 7 is a functional block diagram illustrating an example configuration of the main part of the estimating device 1 that creates the estimating model 33. For convenience of description, members having functions identical to those of the respective members described in FIG. 3 are given respective identical reference numerals, and a description of those members is omitted.

Although FIG. 7 illustrates the example in which the training histological image 32 is stored in advance in the storage section 3 of the estimating device 1, the present invention is not limited to such an arrangement. For example, the image obtaining section 2 illustrated in FIG. 3 may obtain the training histological image 32 from the external device 8.

Further, although the estimating device 1 has the function of creating the estimating model 33 in the example illustrated in FIG. 7, the present invention is not limited to such an arrangement. For example, the estimating model 33 may be created by causing a computer other than the estimating device 1 to perform the processing as described above. In this case, the estimating model 33 created by the computer other than the estimating device 1 may be stored in the storage section 3 of the estimating device 1, and the estimating section 44 may use the estimating model 33.

In the estimating device 1, the control section 4 that is running a learning algorithm for creating the estimating model includes the binarizing section 41, the Betti number calculating section 42, the statistic calculating section 43, the estimating section 44, and an estimating model creating section 46.

[Estimating Model Creating Section 46]

The estimating model creating section 46 performs, on a candidate estimating model, an algorithm for machine learning using the training histological image 32 to create the estimating model 33 (trained). The estimating model 33 (trained) is stored in the storage section 3.

Any known algorithm for machine learning can be applied to the machine learning for creating the estimating model 33. In an example, a k-nearest neighbor algorithm or a weighted k-nearest neighbor algorithm can be used to create the estimating model 33. However, the present invention is not limited to such an arrangement. For example, an algorithm such as Support Vector Machine and Random Forest can be applied to the machine learning for creating the estimating model 33.

In a case where a k-nearest neighbor algorithm or a weighted k-nearest neighbor algorithm is applied to creation of the estimating model 33, the first statistic T1, the second statistic T2, and the third statistic T3 that are normalized on the basis of the average value and dispersion may be used.

This enables adjustment of the extent to which the first statistic T1, the second statistic T2, and the third statistic T3 each affect the estimating model 33.

(Processing to Create Estimating Model 33)

Figure 8:
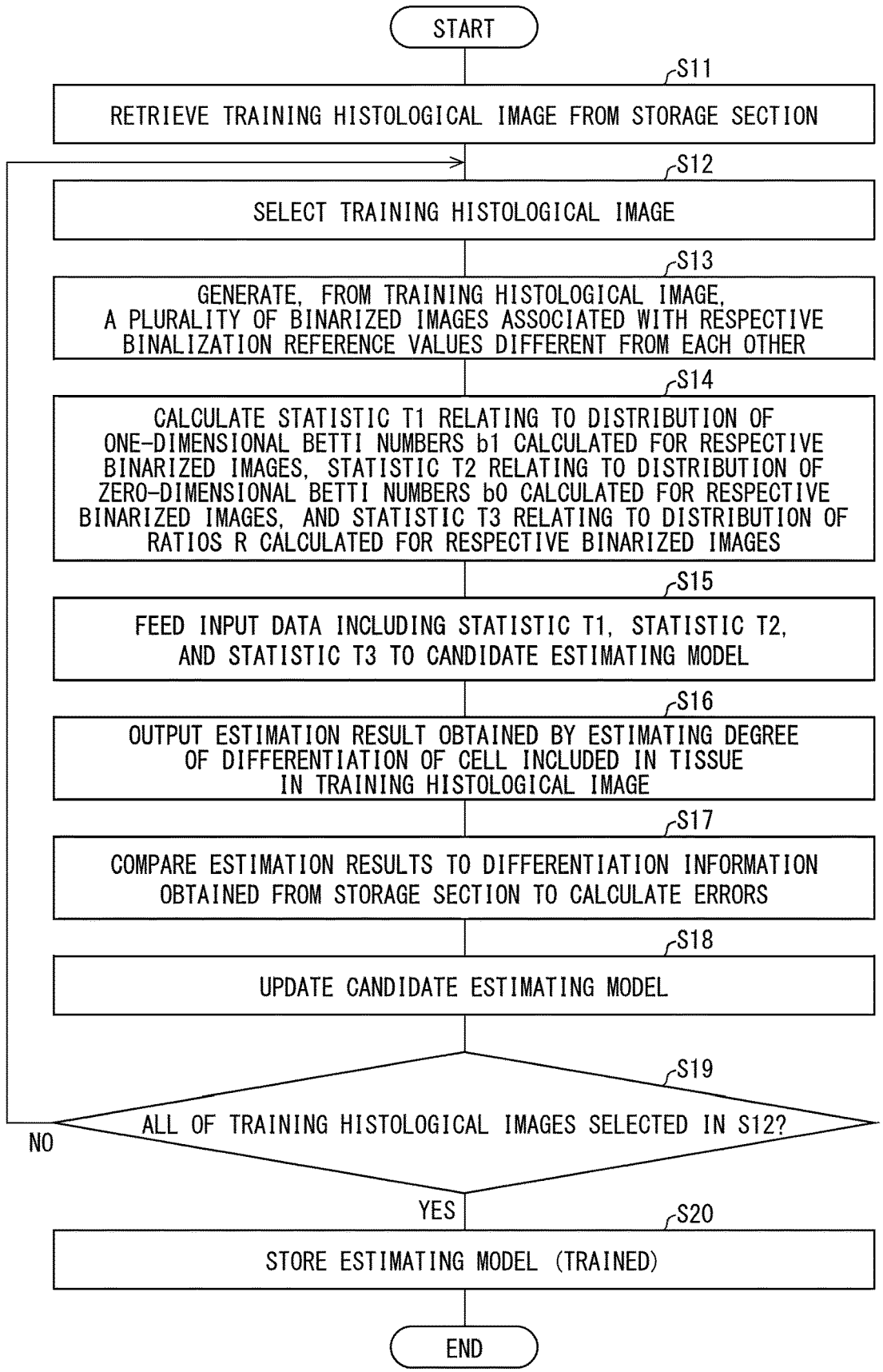
FIG. 8 is a flowchart illustrating an example flow of the processing performed by the estimating device to generate an estimating model.

The following description will discuss, with reference to FIG. 8, the processing to create the estimating model 33. FIG. 8 is a flowchart illustrating an example flow of the processing performed by estimating device 1 to create the estimating model 33.

First, the estimating model creating section 46 retrieves the training histological image 32 from the storage section 3 (step S11), and selects, from the training histological image 32, a training histological image that has not been previously selected (for example, the histological image with a training histological image ID, "P1" in FIG. 6) (step S12).

Then, the binarizing section 41 generates, from the histological image selected by the estimating model creating section 46, a plurality of binarized images associated with the respective binarization reference values different from each other (step S13).

Subsequently, the Betti number calculating section 42 calculates the one-dimensional Betti number b1, the zero-dimensional Betti number b0, and the ratio R for each binarized image, in the same manner as in step S3 in FIG. 5. Then, the statistic calculating section 43 calculates the statistic T1 relating to the distribution of the one-dimensional Betti number b1 calculated for the respective binarized image, the statistic T2 relating to the distribution of the zero-dimensional Betti number b0 calculated for the respective binarized image, and the statistic T3 relating to the distribution of the ratio R calculated for the respective binarized images (step S14).

Next, the estimating section 44 feeds input data including the statistic T1, the statistic T2, and the statistic T3 to the candidate estimating model (step S15), and outputs the estimation result obtained by estimating the degree of differentiation of a cell included in tissue in the histological image (step S16).

Subsequently, the estimating model creating section 46 compares the estimation result output from the estimating section 44 to the differentiation information associated with the histological image selected in step S12 to calculate errors (step S17). In addition, the estimating model creating section 46 updates the candidate estimating model having outputted the estimation result in step S16, such that the calculated errors are minimized (step S18). For example, when a k-nearest neighbor algorithm is used for the machine learning algorithm, a hyper-parameter k may be updated.

In a case where not all of the training histological images included in the training histological image 32 are selected in step S12 (NO in step S19), the estimating model creating section 46 returns to step S12 to select, from the training histological image 32, a histological image that has not been selected. For example, in a case where the histological image with a training histological image ID "P1" is selected, the histological image with a training histological image ID "P2" will be selected next (see FIG. 4).

On the other hand, in a case where all of the training histological images included in the training histological image 32 are selected in step S12 (YES in step S19), the estimating model creating section 46 stores the current candidate estimating model in the storage section 3 as the estimating model 33 (trained) (step S20).

The estimating model thus created can output highly precise estimation result relating to the degree of differentiation of the cell included in the tissue in the histological image 31 in response to inputting the first statistic T1, the second statistic T2, and the third statistic T3 calculated for a given histological image (for example, the histological image 31 in FIG. 3).

It should be noted that the estimating model 33 may be created by causing a computer other than the estimating device 1 to perform the processing illustrated in FIG. 8. In this case, the trained estimating model 33 may be installed on the estimating device 1.

(Assessment of Estimation Precision)

Figures 9, 10:
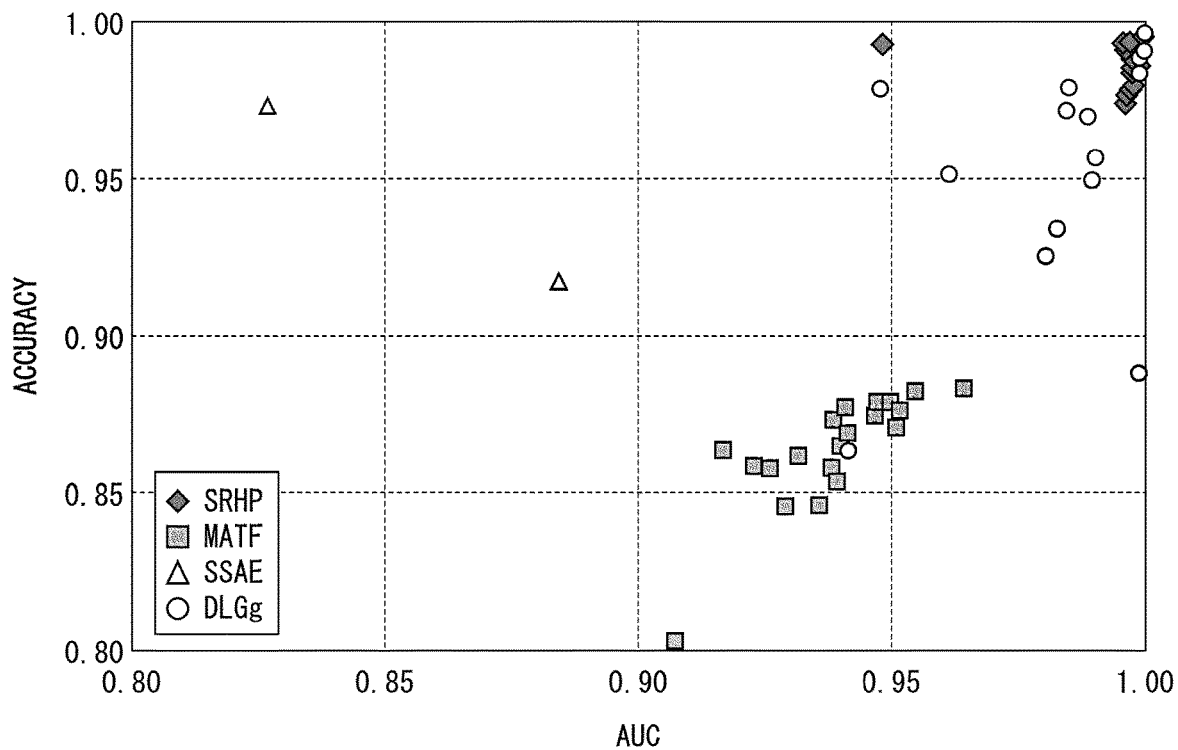
FIG. 9 is a view illustrating the result of comparison between an estimation precision obtained by an image analysis method in accordance with an aspect of the present invention and estimation precisions obtained by any other known image analysis methods.
FIG. 10 a view illustrating the result of comparison between an estimation precision obtained by the image analysis method in accordance with an aspect of the present invention and estimation precisions obtained by any other known image analysis methods.

The following description will discuss the result of assessment on the estimation precision obtained when the image analysis method in accordance with the present invention is applied to needle biopsy images, and Gleason's grades of prostate cancer are estimated from the respective needle biopsy images with reference to FIGS. 9 and 10. FIGS. 9 and 10 are views illustrating the results of comparison between an estimation precision obtained by the image analysis method in accordance with an aspect of the present invention and estimation precisions obtained by any other known image analysis methods.

To assess the estimation precision, 18276 image patches are used, which are extracted from 43 needle biopsy images that has been given results of the determination made by an expert pathologist. As an example, images used as the 43 needle biopsy images are images each including a prostate cancerous region which is classified into grade 3 or 4 of Gleason's grade. This is to assess the estimation precision obtained when grades 3 and 4 are discriminated. The discrimination between grades 3 and 4 is the most difficult in Gleason's grade.

FIG. 9 is a view illustrating indicator values calculated on the basis of an estimation result based on the individual image patches, and FIG. 10 is a view illustrating indicator values calculated on the basis of an estimation result based on the individual needle biopsy images.

In FIGS. 9 and 10, "SRHP" is an abbreviation for "Statistic Representation of Homology Profile" and means the image analysis method in accordance with the present invention. "DLGg" means the approach used by Arvaniti et al. to estimate Gleason's grade for prostate cancer (Arvaniti et al., Sci. Rep. Vol. 8, 2018, doi:10.1038/s41598-018-30535-1). "DLGg" uses a neural network that has undergone supervised learning. "SSAE" means a neural network to which the unsupervised learning algorithm "Stacked Sparse autoencoder algorithm" developed by Xu et al. (Xu et al., IEEE Trans. Med. Imaging Vol. 35(1), p 119-130, 2016) is applied. "MATF" is an abbreviation for "Morphological, Architectural and Textures Features" and means the approach developed by Ali et al. (Ali et al., Comput. Med. Imaging Graph. Vol. 41 p 3-13, 2015).

FIG. 9 illustrates the following six assessment indicators: Area under curve (AUC), Accuracy, Recall, Precision, Specificity, and F1 score.

The SRHP yields higher values than any other approaches in terms of AUC (0.96) that represents discriminant ability, Accuracy (89.02%), Recall (0.94), and F1 score (0.89), and yields favorable values in terms of Precision (0.84) and Specificity (0.84). This suggests SRHP successfully estimates the degree of differentiation of a cell included in tissue in the image patch extracted from the needle biopsy image with high precision.

Further, as illustrated in FIG. 10, SRHP successfully discriminates between grades 3 and 4 of Gleason's grade with high precision for all of the needle biopsy images. This suggests that the estimation by SRHP has robustness.

[Influence of Hyper-Parameter k on Estimating Model Created Using k-Nearest Neighbor Algorithm]

Figure 11:
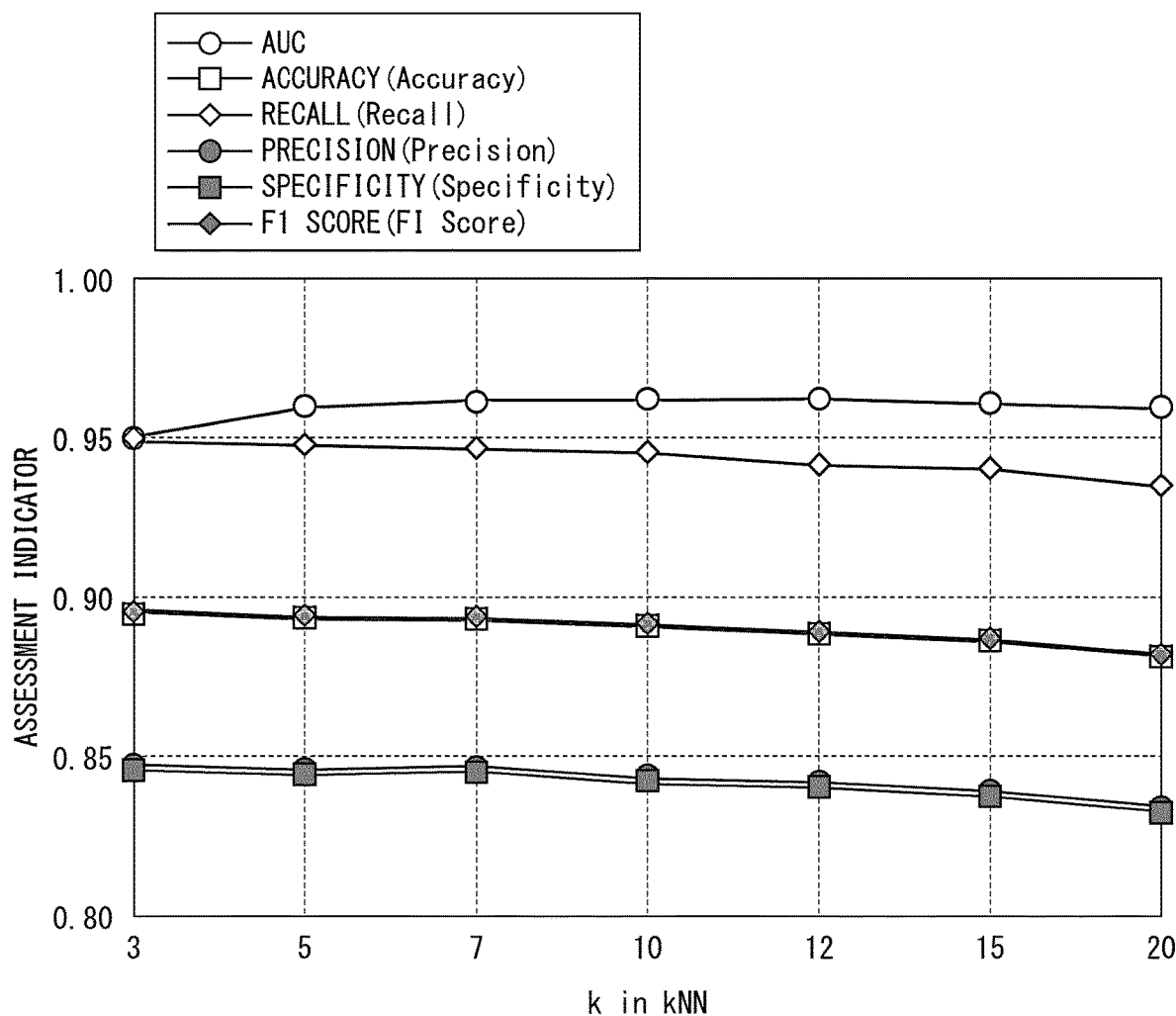
FIG. 11 is a view illustrating various assessment indicators relating to precision of an estimation result output from the estimating model as a function of a hyper-parameter k.

The following description will discuss the influence of the hyper-parameter k on the estimating model 33 created using a k-nearest neighbor algorithm with reference to FIG. 11. FIG. 11 is a view illustrating various assessment indicators relating to precision of the estimation result output from the estimating model 33 as a function of a hyper-parameter k.

As illustrated in FIG. 11, each of the assessment indicators remains high even when the hyper-parameter k is set to any of the values ranging from 3 to 20. This suggests that the estimating model 33 in the image analysis method in accordance with the present invention is robust to the hyper-parameter k.

Embodiment 2

The following description will discuss another embodiment of the present invention. For convenience of description, members having functions identical to those of the respective members described in Embodiment 1 are given respective identical reference numerals, and a description of those members is omitted.

Figure 12:
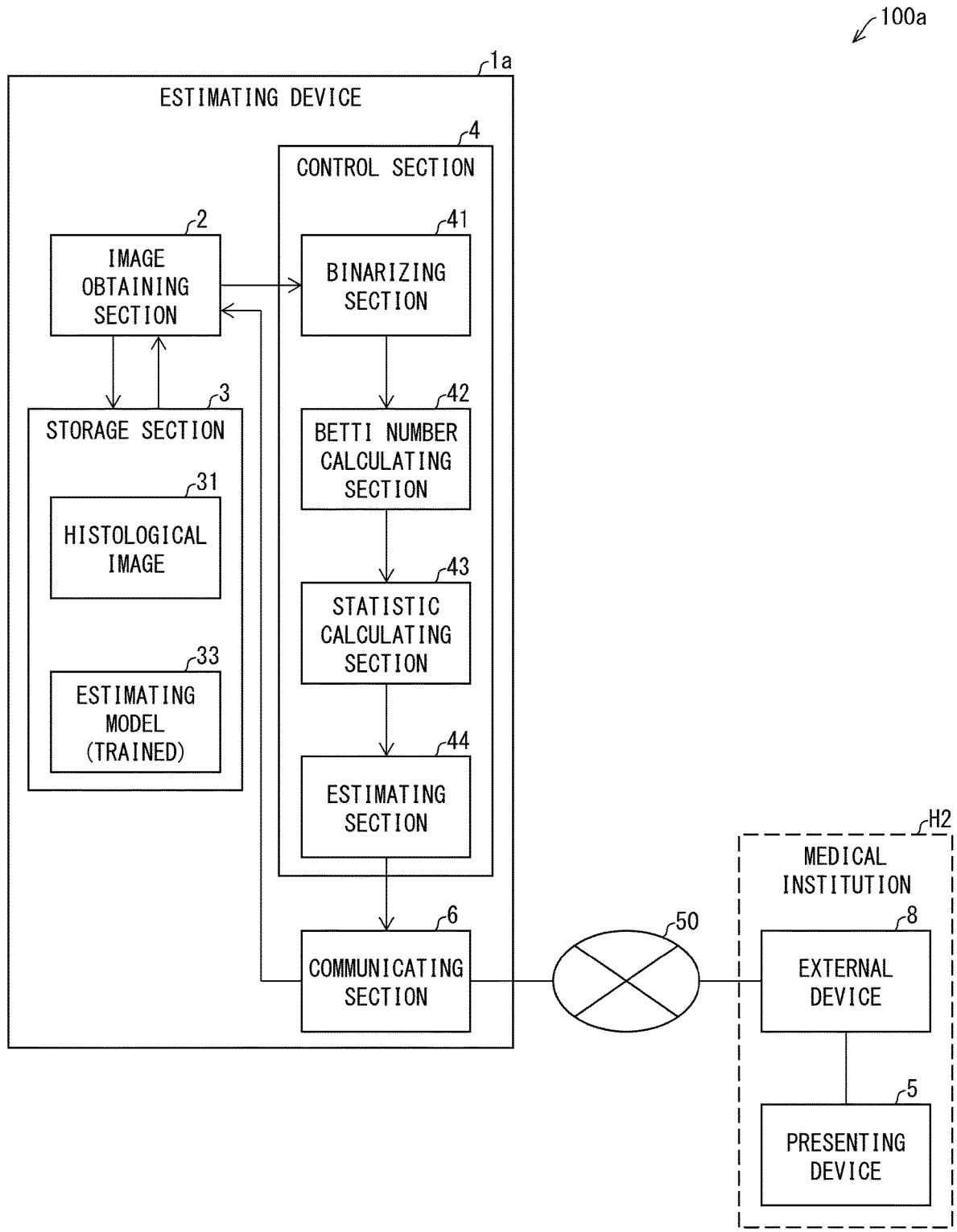
FIG. 12 is a functional block diagram illustrating an example configuration of an estimating system in accordance with an aspect of the present invention.

Although FIG. 3 illustrates an example case in which the medical institution H1 has introduced the estimating system 100, the present invention is not limited to such an example case. For example, an estimating device 1a may be connected to the external device 8 of a medical institution H2 in the manner that allows the estimating device 1a to communicate with the external device 8 over a communication network 50. An estimating system 100a employing such a configuration will be described with reference to FIG. 12. FIG. 12 is a functional block diagram illustrating an example configuration of the estimating system 100a in accordance with an aspect of the present invention.

As illustrated in FIG. 12, the estimating device 1a includes a communicating section 6 serving as a communication interface with the external device 8 of the medical institution H2. This allows the image obtaining section 2 to obtain a histological image from the external device 8 of the medical institution H2 over the communication network 50.

Further, the estimating device 1a sends the estimation result output from the estimating section 44 to the external device 8 over the communication network 50.

The estimating device 1a may be connected to external devices 8a of a plurality of medical institutions in the manner that allows the estimating device 1a to communicate with the external devices 8a. In this case, each of the histological images sent from the medical institutions H2 to the estimating device 1a may be given an image ID indicating the histological image and an identification number (for example, a patient ID) specific to a subject (patient) from which the tissue in the histological image is taken. In addition, each histological image may have been given a medical institution ID indicating the medical institution H2 from which the histological image is sent.

This configuration enables the estimating device 1a to provide, to each of a plurality of medical institutions that sends histological image data, the estimation result obtained by analyzing the histological image having been received from each of the medical institutions. For example, a supervisor who supervises the estimating device 1a may charge each medical institution a predetermined fee as a remuneration for the service offered to provide the estimation result of the estimation from the received histological image.

The estimating device 1a may deliver, to a computer (for example, the presenting device 5 provided in the medical institution H2) with which the estimating device 1a is capable of communicating, a computer program (hereinafter referred to as an image analysis application) for the computer to calculate the first statistic, the second statistic, and the third statistic from the histological image. In this case, for example, the estimating device 1a may send a notification for charging a remuneration for the image analysis application to the computer that has the delivered application installed thereon. In this manner, the supervisor supervising the estimating device 1a may charge the medical institution H2 a predetermined fee as a remuneration for service of providing the image analysis application.

Embodiment 3

The following describes another embodiment of the present invention. For convenience of description, members having functions identical to those of the respective members described in Embodiments 1 and 2 are given respective identical reference numerals, and a description of those members is omitted.

Figure 13:
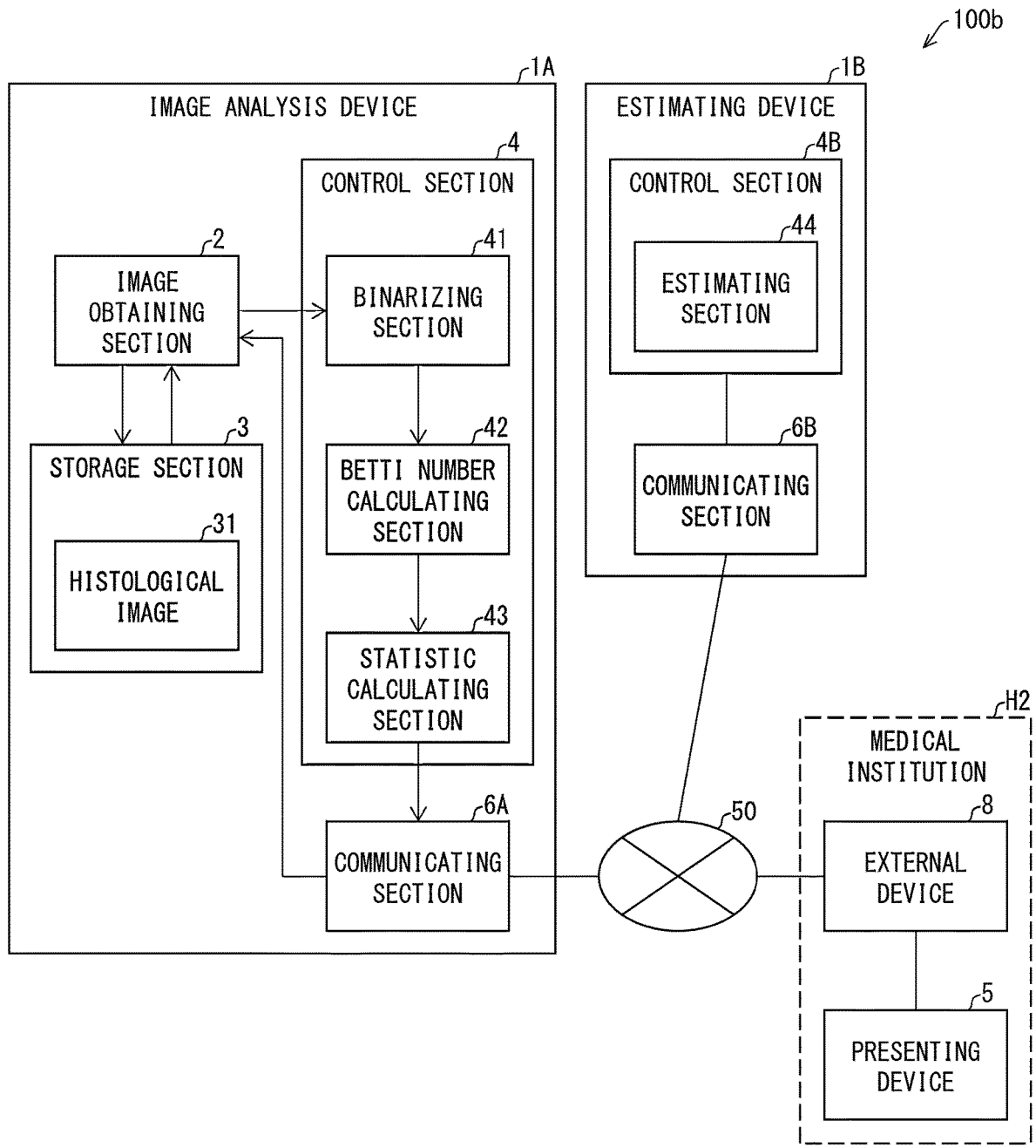
FIG. 13 is a functional block diagram illustrating an example configuration of an estimating system in accordance with an aspect of the present invention.

The estimating device 1 illustrated in FIG. 3 and the estimating device 1a illustrated in FIG. 12 each have both an image analysis function performed on a histological image and an estimation function using the estimating model 33. In other words, each of the estimating device 1 illustrated in FIG. 3 and the estimating device 1a illustrated in FIG. 12 is a single device into which an image analysis device 1A and an estimating device 1B (described later) are unified. However, the present invention is not limited to such a configuration. For example, the functions of the estimating devices 1 and 1a may be implemented by a combination of the image analysis device 1A, which includes the binarizing section 41, the Betti number calculating section 42, and the statistic calculating section 43, and the estimating device 1B, which includes a control section 4B. The control section 4B includes the estimating section 44. The following description will discuss an estimating system 100b employing such a configuration, with reference to FIG. 13. FIG. 13 is a functional block diagram illustrating an example configuration of the estimating system 100b in accordance with one aspect of the present invention.

As illustrated in FIG. 13, the image analysis device 1A includes an external device 8 of the medical institution H2 and a communicating section 6A serving as a communication interface with the estimating device 1B. This allows the image obtaining section 2 to obtain a histological image from the external device 8 of the medical institution H2 over a communication network.

Further, the image analysis device 1A sends, to the estimating device 1B over the communication network 50, the first statistic T1, the second statistic T2, and the third statistic T3 calculated by the statistic calculating section 43.

The estimating device 1B includes a communicating section 6B serving as a communication interface with the image analysis device 1A and the external device 8 of the medical institution H2. This allows the estimating section 44 to obtain the first statistic T1, the second statistic T2, and the third statistic T3 from the image analysis device 1A over a communication network.

Further, the estimating device 1B sends an estimation result output from the estimating section 44 to the external device 8 over the communication network 50.

The estimating device 1B may be connected to a plurality of image analysis devices 1A in the manner that allows the estimating device 1B to communicate with the image analysis devices 1A. In this case, the statistics (including the first statistic T1, the second statistic T2, and the third statistic T3) that are sent from the image analysis devices 1A to the estimating device 1B may be given various IDs. The various IDs may include, for example, an identification number (patient ID) specific to a subject from which the tissue in a histological image as an analysis target is taken, a medical institution ID indicating the medical institution H2 from which the corresponding histological image is sent, and a device ID specific to the image analysis device 1A that has performed the image analysis.

Such a configuration enables the image analysis device 1A to analyze a histological image obtained from each of a plurality of medical institutions to calculate predetermined statistics, and send them to estimating device 1B. The estimating device 1B can output the estimation result using the statistics obtained from the image analysis device 1A, and provide the estimation result to the medical institution from which the histological image data is sent. For example, a supervisor who supervises the estimating device 1B may charge each medical institution a predetermined fee as a remuneration for service of providing the estimation result obtained by the estimation from the histological image obtained from the medical institution.

[Modification]

At least one of the image analysis device 1A and the estimating device 1B may deliver, to a computer (for example, the presenting device 5 provided in the medical institution H2) with which the image analysis devices 1A and 1B are capable of communicating, a computer program (hereinafter referred to as an image analysis application) for the computer to serve as the image analysis device 1A. The computer on which the image analysis application is installed can serve as the image analysis device 1A. In this case, for example, the image analysis device 1A or the estimating device 1B may send a notification for charging a remuneration for the image analysis application to the computer that has the delivered application installed thereon. In this manner, the supervisor who supervises the estimating device 1B can receive a predetermined fee from the medical institutions H2 as a remuneration for the service of providing the image analysis application.

The statistics (including the first statistic T1, the second statistic T2, and the third statistic T3) that are sent to the estimating device 1B from the computer provided in the medical institution H2 and having the image analysis application installed thereon may be given various IDs. The various IDs may include, for example, an identification number (patient ID) specific to a subject from which the tissue in a histological image as an analysis target is taken, a medical institution ID indicating the medical institution H2 from which the corresponding histological image is sent, and a device ID specific to the image analysis device 1A that has performed the image analysis.

This configuration eliminates the need for the medical institution H2 to send any histological image to the outside of the medical institution H2 (for example, to the image analysis device 1A). The medical institution H2 can, by using the image analysis application, analyze each histological image to calculate the first statistic T1, the second statistic T2, and the third statistic T3 from the histological image, and send them to the estimating device 1B.

The histological image, which relates to the diagnostic information of a subject, needs to be sent to the outside of the medical institution H2 in a manner which gives consideration for the protection of personal information. This configuration eliminates the need for sending the histological image to the outside of the medical institution H2. In addition, this configuration enables lower communication load than a configuration in which the histological image itself is sent.

[Implementation by Software]

The control blocks of the estimating devices 1 and 1a, and the image analysis device 1A (particularly, control section 4), and the control block of the estimating device 1B (control section 4B) can be realized by a logic circuit (hardware) provided in an integrated circuit (IC chip) or the like, or can be alternatively realized by software.

In the latter case, the estimating devices 1 and 1a, the image analysis device 1A, and the estimating device 1B include a computer that executes instructions of a program that is software realizing the foregoing functions. The computer, for example, includes at least one processor and a computer readable storage medium storing the program. An object of the present invention can be achieved by the processor of the computer reading and executing the program stored in the storage medium. Examples of the processor encompass a central processing unit (CPU). Examples of the storage medium encompass "a non-transitory tangible medium" such as a read only memory (ROM), a tape, a disk, a card, a semiconductor memory, and a programmable logic circuit. The computer may further include a random access memory (RAM) in which the program is loaded. Further, the program may be supplied to or made available to the computer via any transmission medium (such as a communication network or a broadcast wave) which allows the program to be transmitted. Note that an aspect of the present invention can also be achieved in the form of a data signal in which the program is embodied via electronic transmission and which is embedded in a carrier wave.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1A: image analysis device
1, 1a, 1B: estimating device
5: presenting device
8: external device
41: binarizing section
42: Betti number calculating section (characteristic numerical value calculating section)
43: statistic calculating section
44: estimating section
S3: characteristic numerical value calculation step
S4: statistic calculation step
S5, S6: estimation step

The invention claimed is:

1. An image analysis method of analyzing a histological image obtained by capturing an image of tissue, the method comprising:
a binarization step of generating, from the histological image, a plurality of binarized images associated with respective binarization reference values different from each other;
a characteristic numerical value calculation step of calculating, for each of the plurality of binarized images, (i) a first characteristic numerical value representing the number of hole-shaped regions each surrounded by pixels of a first pixel value and each composed of pixels of a second pixel value, the first and second pixel values given through binarization, (ii) a second characteristic numerical value representing the number of connected regions each composed of the pixels of the first pixel value connected together, and (iii) a third characteristic numerical value representing a ratio between the first characteristic numerical value and the second characteristic numerical value;
a statistic calculation step of calculating a first statistic relating to a distribution of the first characteristic numerical value calculated for each of the binarized images, a second statistic relating to a distribution of the second characteristic numerical value calculated for each of the binarized images, and a third statistic relating to a distribution of the third characteristic numerical value calculated for each of the binarized images; and
an estimation step of feeding input data including the first statistic, the second statistic, and the third statistic, to an estimating model that simulates a correspondence of the first statistic, the second statistic, and the third statistic to a degree of differentiation of a cell included in the tissue, and outputting the degree of differentiation of the cell included in the tissue.

2. The image analysis method according to claim 1, wherein the first statistic, the second statistic, and the third statistic each include at least one of an average value, a median value, a standard deviation, a distribution range, a variation coefficient, skewness, and kurtosis.

3. The image analysis method according to claim 1, wherein the estimating model is created through machine learning using, as learning data, a combination of (1) a training histological image that is obtained by capturing an image of tissue and that has been given in advance differentiation information indicating a degree of differentiation of a cell included in the tissue in the training histological image; and (2) the first statistic, the second statistic, and the third statistic calculated for a plurality of binarized images, which are generated from the training histological image and associated with respective binarization reference values different from each other.

4. The image analysis method according to claim 3, wherein the estimating model is created using a k-nearest neighbor algorithm.

5. The image analysis method according to claim 1, wherein the histological image is an image obtained by capturing an image of a section of the tissue taken from a body of a subject.

6. The image analysis method according to claim 1 wherein the degree of differentiation of the cell included in the tissue is a pathological indicator associated with a structure of a tumor and a degree of infiltration of the tumor.

7. An image analysis device, comprising:
a binarizing section configured to generate, from a histological image obtained by capturing an image of tissue, a plurality of binarized images associated with respective binarization reference values different from each other;
a characteristic numerical value calculating section configured to calculate, for each of the plurality of binarized images, (i) a first characteristic numerical value representing the number of hole-shaped regions each surrounded by pixels of a first pixel value and each composed of pixels of a second pixel value, the first and second pixel values given through binarization, (ii) a second characteristic numerical value representing the number of connected regions each composed of the pixels of the first pixel value connected together, and (iii) a third characteristic numerical value representing a ratio between the first characteristic numerical value and the second characteristic numerical value; and a statistic calculating section configured to calculate a first statistic relating to a distribution of the first characteristic numerical value calculated for each of the binarized images, a second statistic relating to a distribution of the second characteristic numerical value calculated for each of the binarized images, and a third statistic relating to a distribution of the third characteristic numerical value calculated for each of the binarized images.

8. The image analysis device according to claim 7, wherein the image analysis device is configured to deliver a computer program for calculating the first statistic, the second statistic, and the third statistic from the histological image.

9. The image analysis device according to claim 8, wherein the image analysis device is configured to send, to a computer having the computer program installed thereon, a notification for charging a remuneration for provision of the computer program.

10. An estimating device, comprising
an estimating section configured to (i) obtain the first statistic, the second statistic, and the third statistic from an image analysis device according to claim 7, (ii) feed input data including the first statistic, the second statistic, and the third statistic to an estimating model that simulates a correspondence of the first statistic, the second statistic, and the third statistic to a degree of differentiation of a cell included in the tissue, and (iii) output the degree of differentiation of the cell included in the tissue.

11. An estimating system, comprising:
an image analysis device according to claim 7;
an estimating device comprising an estimating section configured to (i) obtain the first statistic, the second statistic, and the third statistic from the image analysis device, (ii) feed input data including the first statistic, the second statistic, and the third statistic to an estimating model that simulates a correspondence of the first statistic, the second statistic, and the third statistic to a degree of differentiation of a cell included in the tissue, and (iii) output the degree of differentiation of the cell included in the tissue;
an external device configured to send the histological image to the image analysis device; and
a presenting device configured to obtain an estimation result output from the estimating device to present the estimation result.

12. A computer readable non-transitory storage medium storing a control program (1) for causing a computer to serve as an image analysis device according to claim 7, wherein the control program causes the computer to serve as a binarizing section, a characteristic numerical value calculating section, and a statistic calculating section, or (2) for causing a computer to serve as an estimating device comprising an estimating section configured to (i) obtain the first statistic, the second statistic, and the third statistic from the image analysis device, (ii) feed input data including the first statistic, the second statistic, and the third statistic to an estimating model that simulates a correspondence of the first statistic, the second statistic, and the third statistic to a degree of differentiation of a cell included in the tissue, and (iii) output the degree of differentiation of the cell included in the tissue, wherein the control program causes the computer to serve as an estimating section.

13. An estimating device, comprising:
a binarizing section configured to generate, from a histological image obtained by capturing an image of tissue, a plurality of binarized images associated with respective binarization reference values different from each other;
a characteristic numerical value calculating section configured to calculate, for each of the plurality of binarized images, (i) a first characteristic numerical value representing the number of hole-shaped regions each surrounded by pixels of a first pixel value and each composed of pixels of a second pixel value, the first and second pixel values given through binarization, (ii) a second characteristic numerical value representing the number of connected regions each composed of the pixels of the first pixel value connected together, and (iii) a third characteristic numerical value representing a ratio between the first characteristic numerical value and the second characteristic numerical value;
a statistic calculating section configured to calculate a first statistic relating to a distribution of the first characteristic numerical value calculated for each of the binarized images, a second statistic relating to a distribution of the second characteristic numerical value calculated for each of the binarized images, and a third statistic relating to a distribution of the third characteristic numerical value calculated for each of the binarized images; and
an estimating section configured to feed input data including the first statistic, the second statistic, and the third statistic to an estimating model that simulates a correspondence of the first statistic, the second statistic, and the third statistic to a degree of differentiation of a cell included in the tissue, and output the degree of differentiation of the cell included in the tissue.

14. The estimating device according to claim 10, wherein the estimating device is configured to deliver a computer program for calculating the first statistic, the second statistic, and the third statistic from the histological image.

15. The estimating device according to claim 14, wherein the estimating device is configured to send, to a computer having the computer program installed thereon, a notification for charging a remuneration for provision of the computer program.

* * * * *